Oct. 29, 1957 R. O. MAHAN ET AL 2,811,445
METHODS FOR MAKING PHOTO CONTOUR MAP
Filed Sept. 11, 1956 2 Sheets-Sheet 1

INVENTORS
Richard O. Mahan
and Roswell M. Towill

BY Donald E. Lane
ATTORNEY

Oct. 29, 1957 R. O. MAHAN ET AL 2,811,445
METHODS FOR MAKING PHOTO CONTOUR MAP
Filed Sept. 11, 1956 2 Sheets-Sheet 2

INVENTORS
Richard O. Mahan
and Roswell M. Towill

BY Donald E. Lane
ATTORNEY

United States Patent Office 2,811,445
Patented Oct. 29, 1957

2,811,445

METHODS FOR MAKING PHOTO CONTOUR MAP

Richard O. Mahan and Roswell M. Towill, Honolulu, Territory of Hawaii

Application September 11, 1956, Serial No. 609,311

7 Claims. (Cl. 96—43)

This invention relates to photogrammetry, and more particularly to improved methods and apparatus for producing accurate photographic contour maps.

Aerial surveying is a well developed art, and aerial photographs of a terrain may be made to show a great amount of useful detail. The distance between the camera in the plane and the terrain is now determined by use of stereoscopic cameras. By the use of the stereoscopic principle, it is possible to draw an accurate contour map from analysis of a series of overlapping aerial photographs. By the use of known plotting apparatus, it is also possible to produce a composite photographic map of a given area. Such composite photographic maps may be made so that most errors of tilt and distortion in the individual aerial photographs are substantially eliminated. However, it has not appeared practical to combine a composite photographic map with a contour map because of the distortion of perspective in such composite photographic maps. While many adjustments and approximations have been tried in attempts to produce an accurate photographic map, heretofore it has been considered impossible to produce a photographic contour map having sufficient accuracy for survey purposes.

It is an object of the present invention to provide a method of photographically producing an accurate photo contour map from a series of aerial photographs.

It is another object of this invention to provide a method of producing a photocontour map which includes the best features of a conventional topographic map and also includes the best features of the controlled mosaic map.

It is another object of this invention to provide a method of producing a photo contour map which has the same degree of accuracy as does the conventional topographic map made by photogrammetric methods, and which also accurately portrays the great amount of detail delineated by a photographic image.

It is another object of this invention to produce a photo map including accurate information not shown by the photographic image but shown by contours, elevations, coordinates, and names delineated by lines and symbols reproduced photographically on the map.

It is a further object of this invention to provide improved apparatus for producing accurate photo contour maps.

Other objects and advantages of this invention will be readily apparent to those skilled in the photogrammetric art from examination of the following description of the methods used, and from examination of the accompanying drawings, illustrating an improved restitutional enlarger construction used in the described methods, wherein.

Figure 1:
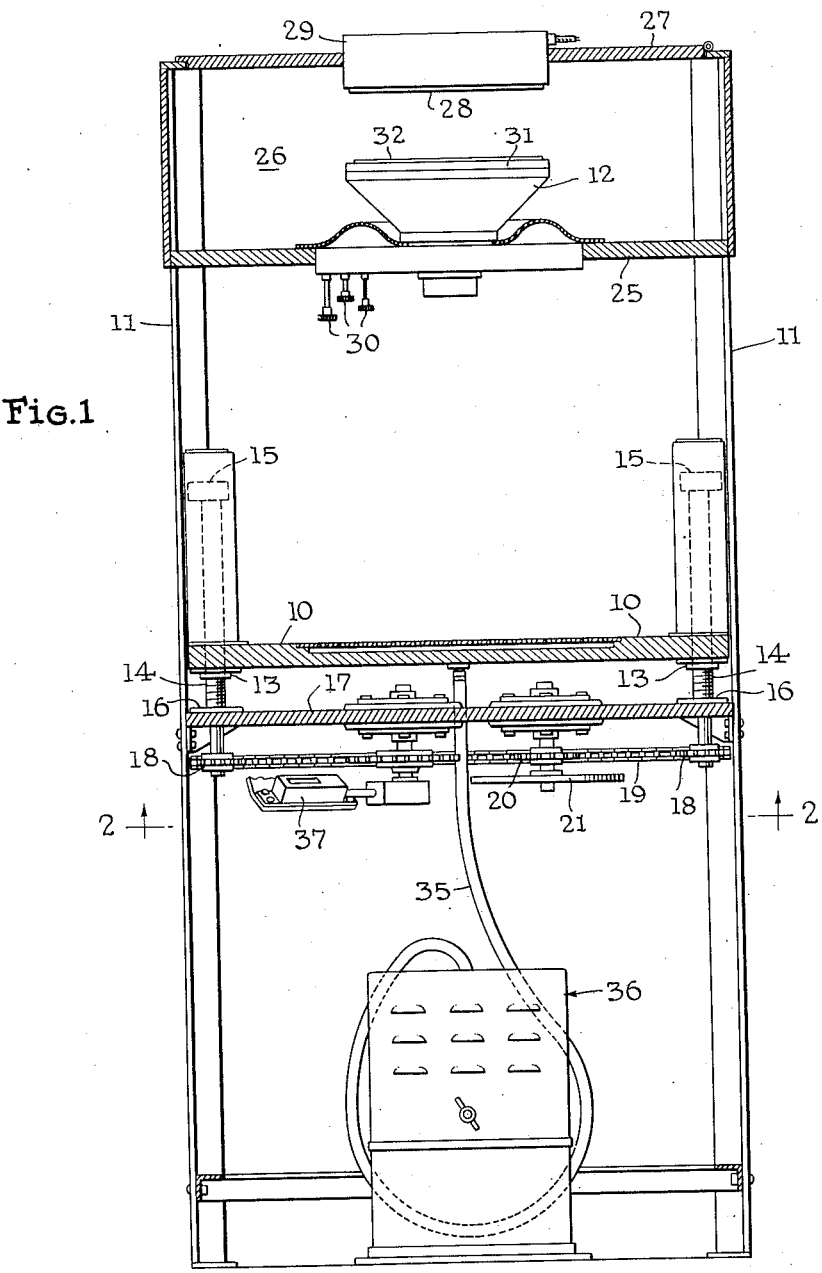
Figure 1 is an elevational view, partly diagrammatic, of a restitutional enlarger embodying some of the features of our invention and useful in the practice of our improved methods for producing accurate photographic contour maps.
Figure 2:
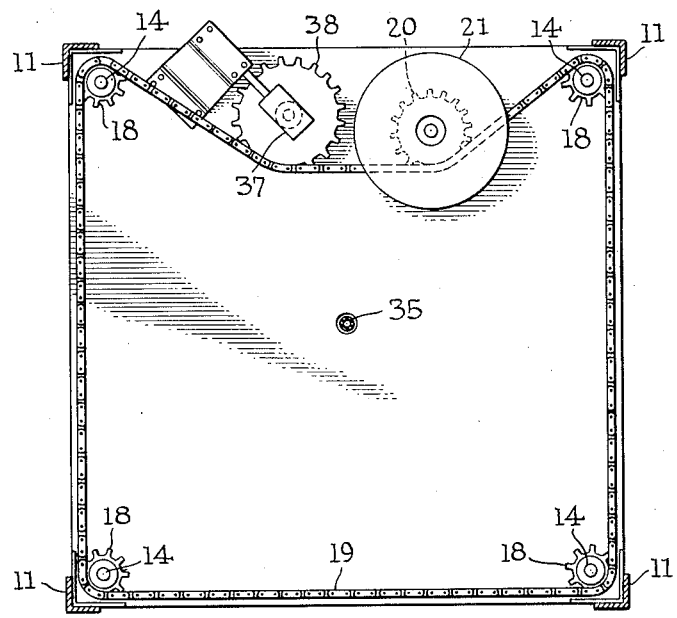
Figure 2 is a horizontal sectional view taken on line 2—2 of Figure 1.
Figure 3:
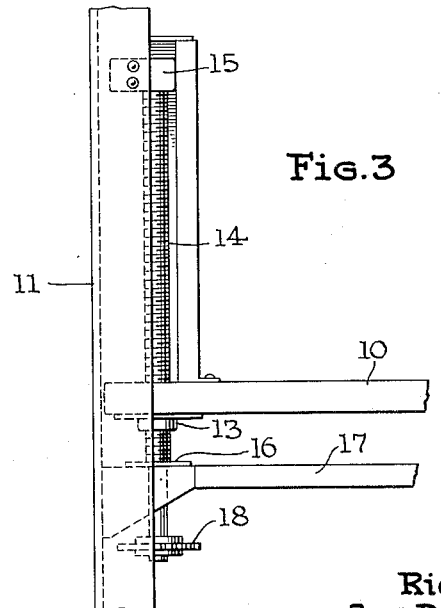
Figure 3 is an elevational view, partly in section, showing a detail of the apparatus shown in Figures 1 and 2.

Our improved method of making an accurate photo contour map will now be described. A series of overlapping stereoscopic aerial photos are taken on flight lines over the terrain to be mapped. The flight lines are laid out and the photos taken so that the stereoscopic photos will have about thirty-five percent sidelap, and will have about sixty percent overlap along given lines of flight. The aerial photos may be made with an eight and one-quarter inch camera having a nine inch by nine inch format, and the exposures may be made through a minus blue filter. The negative film is developed in the usual way and may be printed on paper.

Next, glass plate diapositives are made from the aerial film in a photographic contact printer, there being a pair of glass plate diapositives for each exposure. The glass plate diapositives should be prepared with care to secure as fine as possible photographic reproduction from the negative film, since further reproductions are made from the diapositive plates. The next step is to lay out a semi-transparent compilation sheet with coordinates and with plotted horizontal control points whose positions are accurately known by a prior surface triangulation survey. The compilation sheet is preferably of a semi-transparent low-shrink material on which the plane coordinates are laid out at a scale about four times as large as the scale of the aerial photography used.

The next step is to scale and analyze the glass plate diapositives of the individual flights by means of a conventional Kelsh plotter, which may be of the general type disclosed in the patent issued to Harry T. Kelsh, No. 2,492,870, dated December 27, 1949. A principal point and two transfer or pass points are marked upon each diapositive plate by placing three small ink dots on the plates in a line at right angles to the line of flight. The first stereo model is then set up in the Kelsh plotter and a pair of diapositive plates are oriented to position selected locations of the image upon corresponding locations previously plotted upon the compilation sheet which is secured upon the board of the Kelsh plotter. The inner orientation between the two diapositives is accomplished by the usual Kelsh plotter controls, and the stereo model is thus set to horizontal and vertical control as accurately as possible using the compilation sheet on which the horizontal control has been plotted. The compilation sheet is then removed from and a scale sheet is positioned on the board of the Kelsh plotter. The scale sheet is also a sheet of semi-transparent low-shrink material, but having no information plotted thereon. The two principal points and the four pass points previously marked on the two glass plate diapositives of the stereo model are projected to and marked by dots on the scale sheet and are properly located by utilizing the conventional Kelsh plotter tracing table. The vertical reading of each of the several points is observed with the plotter and is recorded, and likewise the plotter readings of all ground vertical control points appearing on the stereo model are recorded. The $x$ and $y$ tilt of each diapositive plate of the stereo model is then read with a conventional tiltmeter and the reading is recorded. The pair of diapositive plates forming the first stereo model are now removed from the Kelsh plotter, and a second stereo model is set up using one of the plates from the first model and the next plate along the line of flight. The plate from the first model is given the same $x$ and $y$ tilt as it had in the first model. The inner orientation between the two diapositive plates of the second stereo model is now accomplished by the Kelsh plotter controls and the model is set to horizontal and vertical control using again the compilation sheet on which the horizontal control was initially plotted. The second stereo model is now adjusted to align the three common pass points with those marked on the scale sheet of the first model, and the next three pass points as well as any identified horizontal ground control points are then located and marked on the scale sheet. Vertical plotter readings are determined and recorded on all points, including all vertical field control. The above procedure is then followed for all successive stereo models of a flight.

The next step is to place the scale sheet, which now has indicated thereon the positions of all pass points, identified horizontal points and vertical points, under the compilation sheet. The scale sheet is then analyzed as to overall scale by comparison of the plotted horizontal positions on the compilation sheet with the stereo plotter positions indicated on the scale sheet. Graphically, the scale of the stereo plotter positions on the scale sheet is expanded or shortened to fit the scale of the compilation sheet. After the necessary small scale adjustment is determined, the corrected positions of the pass points on the scale sheet are transferred to the compilation sheet as ink dots, and said dots thereafter serve as control in setting up the stereo models for compilation. After the completion of the above scale operation in which the positions on the scale sheet are corrected as to scale and transferred to the compilation sheet, the compilation sheet is remounted on the board of the Kelsh plotter.

The next step is to again set up in turn each of the stereo models, and to fit each pair of diapositive plates to the horizontal plotter control points established on the compilation sheet by the scaling operations. Each stereo model is processed by the Kelsh plotter and data is marked on the compilation sheet to show contours, numbers, elevations, coordinates, boundaries, and any other data which will be required on the finished photo contour map but which is not delineated by photographic detail. Before the completed model is removed from the plotter, the pass points on the glass plate diapositives are marked on the compilation sheet in their perspective positions as well as in their true map positions in order to provide a simple way for orienting the projected rectified image of the restitutional enlarger, hereinafter described, to the copy of the compilation sheet.

The next step is to ink the compilation or worksheet, faithfully following the pencilled data, mechanically drafting all numbers, names, coordinates and other information necessary to the finished map. A high contrast negative film is then made from the inked compilation sheet in a contact printer. Then a positive film is made from the high contrast negative film by a contact printer, and the positive film may be made in sections, each section covering the area of terrain to be processed from an individual aerial exposure. The positive film shows all the line detail of the compilation sheet. Red masking tape is laid over the net area of the positive film to be processed so as to prevent any blue light from passing through the positive film, but to allow some visible light to pass. The masked positive film is next placed over a light table so that the contour lines are visible through the masking tape. A sharp knife is used to cut the masking tape along the contour lines, but the cuts are not deep enough to cut through the positive film. The entire mask is cut in increments, each increment being equal to a difference in terrain elevation of approximately two tenths of one percent of the elevation of the aerial camera above the terrain. This increment may be equal to approximately every other plotted contour line. The purpose of the cutting of the masking tape along contours is to allow portions of the mask to be opened up and to thus provide areas transparent to blue light while other portions of the masked positive film will remain opaque to the same light.

Upon completion of the stereo model plotting operations mentioned above, much information has been recorded about the spacial orientation of the aerial camera at the instant each photograph was taken. The elevation of the camera above the terrain, its $x$ tilt across the line of flight, its $y$ tilt along the line of flight, are all recorded directly from the Kelsh plotter and a conventional tiltmeter.

The next step of the method involves the use of the restitutional enlarger illustrated in the accompanying drawings. The construction of said restitutional enlarger will be described before proceeding with the explanation of the method. The enlarger is in general a fixed focus enlarger having the same spacial relationships as the Kelsh plotter referred to above, and is a spacial duplication of the aerial camera. The enlarger is so designed that the $x$ and $y$ tilt of the glass plate diapositives, as determined in the Kelsh stereo plotter can be duplicated and hence the projected image to the horizontal image plane of the enlarger will be absolutely restituted.

The restitutional enlarger includes a rectangular work table 10 supported for vertical movement in a four-legged frame 11, and includes an image projecting device 12 supported in the upper part of frame 11 above the work table 10. At each corner of the table 10, there is a threaded bushing 13 secured to the table and engaging a threaded shaft 14, the shaft 14 being secured at its upper end in a bearing 15 attached to the frame 11. The shaft 14 is secured at its lower end in a bearing 16 carried by the horizontal platform 17. The platform 17 is rigidly secured in the frame 11. The lower end of each shaft 14 is provided with a sprocket 18 below the platform 17, and the sprockets 18 are connected by a continuous chain 19 which rotates all the four sprockets simultaneously to raise or lower the work table 10 in the frame 11. A sprocket 20 rotatably supported by the platform 17 engages the chain 19 and is provided with a hand wheel 21 to permit manual adjustment of the height of the work table 10 by operation of the wheel 21. The image projecting device 12 is mounted through the lower side 25 of a light box 26, and the cover 27 is provided with a light-diffusing screen 28 above the projecting device 12 and with a source of light 29 above the screen 28. The projecting device 12 is like one of the projecting heads of the Kelsh plotter, and is provided with three control knobs 30 to permit adjustment of the head 12 for $x$ and $y$ axis tilt, and for rotary adjustment of the head on a vertical axis. The top 31 of the projecting device 12 is adapted to receive thereon a glass plate diapositive 32. The details of such projecting devices are well known to those skilled in the art and are not a feature of the present invention. A diapositive plate 32 may be placed on the top of the projecting device 12 by raising the hinged cover 27. The work table 10 may be of the well known vacuum hold-down type provided with surface grooves connected by a flexible tube 35 to a vacuum pump 36. An indicator 37 is mechanically connected by gears and shafts to a sprocket 38 engaging the chain 19. The enlargement indicator 37 may be calibrated to correspond to the vertical control readings secured from the plotter table indicator of the Kelsh plotter mentioned above.

Using the restitutional enlarger illustrated and described above, the glass plate diapositive 32 is positioned on the top 31 of the projecting apparatus 12, and the apparatus is oriented and adjusted by the controls 30 to provide the plate 32 with the same $x$ and $y$ tilt existing when that plate was set up in the stereo model in the Kelsh plotter. The restitutional enlarger is thus set up as a spacial duplication of the stereo model and of taking aerial camera. Since the $x$ and $y$ tilts of the camera as determined in the stereo plotter model are duplicated in the enlarger, the projected image to the horizontal image plane of table 10 is absolutely restituted. When this condition is obtained and knowing the elevation of the taking camera above the terrain and knowing the focal length of the taking camera, the exact amount of enlargement of the glass plate diapositive necessary to produce a projected image on table 10 to a true scale at any known ground elevation or contour can be computed.

Next the masked positive film corresponding to the diapositive 32 is placed on the table 10 and oriented so that the perspective datum control points on the mask fit the projected ink dots from the diapositive plate 32. Sometimes a slight adjustment in the amount of the enlargement is necessary, and is easily obtained by turning the wheel 21 to raise or lower the table 10. It is seldom necessary to readjust the tilt by controls 30 to make the projected control points coincide with those on the masked positive film on table 10. Orientation pins are secured to the table 10 and engage the masked positive film so that the film may be removed from and be replaced on the table 10 in nearly complete darkness with absolute certainty of maintaining its correct orientation. Under a subdued red light, the masked positive film is removed from the table 10, and a piece of sensitive commercial film is firmly taped to the table 10 and held flat thereon by the vacuum hold-down. The masked positive film is taken out of the enlarger to a light table where a section of the masking tape is removed from the film to open up an area of transparent film between two contours. The mask is then taken back to the enlarger and placed over the sensitive commercial film in proper position determined by the orientation pins. The restitutional enlarger is set at an enlargement correct for the elevation half way between the two contours which define the edges of the transparent open area of the masked film. A time exposure is then made by opening the shutter of the projecting device 12 and allowing the projected image to be passed through the unmasked area to the underlying sensitive film. Any light which hits the line work on the unmasked area of the positive film is held back, and thus the line work is recorded photographically on the sensitive film along with the projected image.

After the first area exposure has been completed, the partially masked positive is removed from the enlarger to the light table. The open area of the masked positive is then opaqued with a commercial liquid opaquing material which is allowed to dry. Then the next area of the mask is opened up by removal of the next section of the already-cut masking tape, thus clearing an area adjacent to the first area but an area defining a different elevation of terrain. The mask is again returned to the enlarger table, reregistered in proper position on the orientation pins, and the table is adjusted to provide the proper amount of enlargement for the mean elevation of the new unmasked area. A second time exposure is then made by opening the shutter of the projecting device 12 and a new area is recorded on the commercial sensitized film under the partially open mask. The steps of removing the mask, opaquing the exposed open area of the mask, opening a new area of the mask, returning the mask to proper position in the enlarger, and making the next exposure are repeated until all areas of the mask have been opened up and exposures made at proper enlargement for the elevation of each individual area.

Next, the exposed sensitive film is removed from the enlarger table 10, is developed, fixed, washed, and dried in the form of a negative. A series of such negatives are then contacted to a stable film base material coated with a photographic print emulsion. The resulting prints are joined together into large sections by matching and aligning the coordinate lines reproduced thereon, all prints being left with sufficient margins to provide overlap for cementing the prints together. The large sections are then copied in a conventional copying camera to provide negative prints of accurate photo contour maps in the size required. Positive prints of the photo contour map may then be made by contact printing the copy negative.

The photo contour map made by the above described method and apparatus has many advantages over the conventional topographic or contour map in that the photo contour map includes a great amount of information delineated photographically and information lacking from the topographic map. Topographic maps are generally made for a specific purpose or use, and show only the information required for said purpose. Such specific and limited information is often inadequate when a new problem arises. The tremendous extent of information recorded on the described photo contour map is both accurate and adequate for all problems that may arise. The method and apparatus herein described corrects for the distortion of perspective in conventional photo maps, and permits the production of an accurate photo map having accurate contours, coordinates and other topographic detail included thereon.

The foregoing portion of the present specification is a complete disclosure embodied in my copending application S. N. 402,800, now abandoned, of which the present application is a continuation in part. Substantially all of the steps of the method hereinbefore described are deemed necessary to produce a photo contour map in accordance with the present invention. However, certain ones of the steps as described hereinbefore can be handled more easily with the use of materials which became commercially usable during the pendency of the aforementioned copending application. Specifically, there is now available in a commercially successful form, a product known as "Ektagraphic" stripping film. This film has the somewhat unusual property that once portions, for example, contour lines, have been exposed and the film developed, thereby removing the emulsion at points corresponding to the contour line negative, the remaining portions of the emulsion may be easily physically separated from the acetate or other backing material. Accordingly, it is possible to make a contact print of the contour lines on stripping film, and when the film is developed, those portions corresponding to the contour lines will be clear because the emulsion has been removed therefrom in the developing process, and the fixed emulsion will remain between the contour lines. In order to proceed with the preparation of the final negative from which the maps will be reproduced, it is then only necessary to remove the emulsion between selected contour lines before projecting therethrough the corresponding enlarged and restituted image for that area. It will be readily appreciated by those skilled in this art that the use of a stripping film of this type becomes a considerable time saver over the masking and cutting operations as described hereinbefore.

Still another new material which finds use in practicing the method of the present invention is a product known commercially as "Scribe Line." This latter material comprises a substantially opaque covering on a clear acetate base. The opaque covering is such that this material can be used for the compilation sheet. That is to say, the plotting of the contour lines from the stereo models may be done in pencil directly on "Scribe Line" material. Once the contour has been thus plotted, however, it is a simple matter using a sharp, pointed instrument to follow each pencilled contour line with the instrument and the opaque covering strips away from the clear backing only along those areas which are actually contacted by the pointed instrument. Once the contour lines have been scribed or gouged from the "Scribe Line" material, the next step in practicing the process of the present invention is to prepare a contact print from the "Scribe Line" sheet. Such a print yields a transparent background with the contour lines in opaque form. From this sheet, a second contact print is made on the stripping film material. The stripping film, when photographically imprinted with the images of the contour lines, forms a semi-opaque sheet with clear contour lines. It is this sheet, so prepared, which is then used in preparing the negatives from which the ultimate maps are reproduced. In all other respects, the process of the invention using "Scribe Line" and stripping film is identical with that which has been previously described.

Various modifications and other advantages of the methods and apparatus described herein will be readily apparent to those skilled in the art of photogrammetry, and many such changes in minor details will be included within the scope of the appended claims.

We claim:

1. A method of photographically producing a contour map from a series of stereoscopic aerial photographs, said method including the steps of forming diapositives of said aerial photographs, plotting contour lines on a compilation sheet utilizing stereo models projected from said diapositives, forming a transparent film positive of said compilation sheet, covering said transparent positive with an opaque mask, removing from said positive that portion of said mask which lies between selected contour lines, placing said partly unmasked positive against a photosensitive medium, projecting a restituted and enlarged image from one of said diapositives against that portion of said photosensitive film exposed by the unmasked portion of said positive, the amount of enlargement being selected to provide a projected image of correct size for the mean elevation of the unmasked area, remasking the unmasked portion of said positive, removing a second portion of said mask which lies between other selected contour lines, projecting a restituted image enlarged to provide a projected image of correct size for the mean elevation of said second unmasked area, repeating said unmasking, projecting and remasking steps until all the desired image areas of said diapositives are photographically recorded on said photosensitive medium along with the contour lines recorded on said transparent film positive, developing said exposed film, and producing a map therefrom.

2. The method defined in claim 1 and including the step of delineating on said compilation sheet coordinate lines and the positions of points whose positions are known from surface triangulation.

3. The method defined in claim 1 and including the steps of marking transfer points on each diapositive, orienting the diapositives in the stereo model with respect to each other and with respect to data on said compilation sheet, substituting a scale sheet for the compilation sheet in the stereo model, marking on said scale sheet the projected images of said transfer points, modifying the scale of the said points on the scale sheet to correspond to the scale of the compilation sheet, marking said modified points on said compilation sheet, and orienting the projected enlarged image to coincide with the copy of said point markings on said transparent film positive.

4. The method defined in claim 1 and including the step of cutting said opaque mask along selected contour lines of said transparent film positive.

5. The method defined in claim 1 and including the steps of orienting the diapositives in said stereo models with respect to each other and with respect to data on said compilation sheet, recording the vertical readings of selected points and recording the tilt of each diapositive, and utilizing said recorded data to restitute said diapositive during the projection of said enlarged image.

6. A method of photographically producing a contour map from a series of stereoscopic aerial photographs, the steps comprising: forming diapositives of said aerial photographs; plotting contour lines on a compilation sheet utilizing stereo models projected onto said sheet from said diapositives; forming from said compilation sheet a second sheet upon which the contour lines appear with the intervening areas masked by an opaque medium removable between any selected contours; placing said second sheet in overlying contact with a photosensitive medium; projecting onto said medium through unmasked portions of said second sheet between selected contour lines a restituted and enlarged photographic image of the actual area between said lines, the amount of enlargement being selected to provide a projected image of the correct scale for the mean elevation of the area between said selected contour lines; making repeated projections onto said medium through unmasked portions of said second sheet between additional selected contour lines with the remaining areas masked until all of the desired image areas of said image are recorded on said photosensitive medium along with the contour lines; developing said exposed medium; and producing a map therefrom.

7. A method of photographically producing a contour map from a series of stereoscopic aerial photographs, the steps comprising: forming diapositives of said aerial photographs; plotting contour lines on a compilation sheet utilizing stereo models projected onto said sheet from said diapositives; placing said compilation sheet in overlying relation with a photosensitive medium having a strippable emulsion and forming a finished negative of said compilation sheet on said medium; placing said finished negative in overlying contact with a second photosensitive medium and exposing said second medium to light projected through the contour line portions of said finished negative to transfer the contour lines to the second medium; removing the strippable emulsion from said finished negative between selected contour lines and projecting onto said second medium through that portion of said finished negative from which the emulsion has been stripped, a restituted and enlarged photographic image of the actual area between said selected contour lines, the amount of enlargement being selected to provide a projected image of the correct scale for the mean elevation of the area between said selected contour lines; making repeated projections onto said second medium through additional unmasked portions of said second sheet between additional selected contour lines with the remaining areas masked until all of the desired image areas of said image are recorded on said second photosensitive medium along with the contour lines; developing said exposed second photosensitive medium; and producing a map therefrom.

References Cited in the file of this patent

UNITED STATES PATENTS

| 1,980,981 | Cooke | Nov. 20, 1934 |
| 2,085,498 | Horner | June 29, 1937 |
| 2,200,594 | Diggins et al. | May 14, 1940 |